United States Patent
Tamai

(10) Patent No.: US 10,693,316 B2
(45) Date of Patent: Jun. 23, 2020

(54) UNINTERRUPTIBLE POWER SUPPLY

(71) Applicant: Fuji Electric Co., Ltd., Kanagawa (JP)

(72) Inventor: Yasuhiro Tamai, Tokyo (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 12 days.

(21) Appl. No.: 16/212,223

(22) Filed: Dec. 6, 2018

(65) Prior Publication Data

US 2019/0214847 A1 Jul. 11, 2019

(30) Foreign Application Priority Data

Jan. 5, 2018 (JP) .................................. 2018-000791

(51) Int. Cl.
*H02J 9/06* (2006.01)

(52) U.S. Cl.
CPC ..................................... *H02J 9/062* (2013.01)

(58) Field of Classification Search
None
See application file for complete search history.

(56) References Cited

U.S. PATENT DOCUMENTS

2013/0082636 A1* 4/2013 Ohori ........................ H02P 4/00
318/723
2016/0352127 A1* 12/2016 Prakash ................... H02J 9/062

FOREIGN PATENT DOCUMENTS

JP 2016-178710 A 10/2016

* cited by examiner

*Primary Examiner* — Jared Fureman
*Assistant Examiner* — Aqeel H Bukhari
(74) *Attorney, Agent, or Firm* — Chen Yoshimura LLP

(57) ABSTRACT

An uninterruptible power supply includes a main uninterruptible power supply unit including a converter, an inverter, and a battery, as well as an input transformer which is arranged between an AC power supply and the converter and transforms the AC voltage from the AC power supply. The uninterruptible power supply further includes a DC component extraction unit that extracts a DC component from current flowing between the AC power supply and the converter, as well as a CPU which, when the DC component extracted by the DC component extraction unit is greater than a threshold current, stops operation of the converter and causes DC voltage from the battery to be supplied to the inverter.

12 Claims, 10 Drawing Sheets

Embodiments 1 and 2

Embodiments 1 and 2

Embodiments 1 and 2

UNINTERRUPTIBLE POWER SUPPLY

BACKGROUND OF THE INVENTION

Technical Field

The present invention relates to an uninterruptible power supply including a converter which converts AC voltage from an AC power supply to DC voltage.

Background Art

Uninterruptible power supplies which include a converter for converting AC voltage from an AC power supply to DC voltage are conventionally well-known (see Patent Document 1, for example).

The uninterruptible power supply of Patent Document 1 includes a converter which converts power from an AC power supply to DC power, an inverter which converts the DC power from the converter to AC power and supplies that AC power to a load, and a DC power supply which supplies power to the load via the inverter when the AC power supply is abnormal. Moreover, this uninterruptible power supply further includes a fault determination unit which, on the basis of the AC current flowing through the uninterruptible power supply as well as the DC voltage between the converter and the inverter, determines whether the uninterruptible power supply has malfunctioned. More specifically, if no abnormality in the DC voltage between the converter and the inverter is detected during a prescribed period of time after an overcurrent has been detected in the uninterruptible power supply, the fault determination unit determines that a transient malfunction has occurred. Meanwhile, if an abnormality in the DC voltage between the converter and the inverter is detected during the prescribed period of time after an overcurrent has been detected in the uninterruptible power supply, the fault determination unit determines that an abnormality has occurred in the uninterruptible power supply. When it is determined that a transient malfunction has occurred, operation of the uninterruptible power supply is continued. When it is determined that an abnormality has occurred in the uninterruptible power supply, operation of the uninterruptible power supply is stopped.

RELATED ART DOCUMENTS

Patent Documents

Patent Document 1: Japanese Patent Application Laid-Open Publication No. 2016-178710

SUMMARY OF THE INVENTION

Although this is not explicitly described in Patent Document 1, in a conventional uninterruptible power supply of the type disclosed in Patent Document 1, an input transformer for transforming AC voltage from the AC power supply is sometimes arranged between the AC power supply and the converter. Here, it is known that if the AC current flowing through the input transformer includes a DC component on the order of 1% of the current rating, magnetic bias (a phenomenon in which a DC component is introduced into the magnetic flux) typically occurs in the input transformer. It is also known that when magnetic bias occurs in the input transformer, phenomena such as distortion of the transformed voltage waveform from the input transformer tend to appear.

Moreover, even if a DC component on the order of 1% of the current rating is included in the AC current, the likelihood of that AC current being detected as overcurrent is low. Therefore, in the uninterruptible power supply of Patent Document 1, even if a DC component on the order of 1% of the current rating is included in the AC current, this is not detected as a malfunction, and operation of the device is not stopped. Thus, in a conventional uninterruptible power supply in which an input transformer is arranged between the AC power supply and the converter, because AC current including a DC component sometimes flows through the input transformer, there is a problem in which the resulting magnetic bias causes operation of the uninterruptible power supply to become abnormal.

The present invention was made to solve the abovementioned problems, and one object of the present invention is to provide an uninterruptible power supply which makes it possible to prevent abnormal operation resulting from magnetic bias in an input transformer.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an uninterruptible power supply, including: an input transformer connected to an input node that is configured to be connected to an AC power supply so as to transform AC voltage from the AC power supply; a converter receiving the transformed AC voltage to convert the transformed AC voltage to DC voltage; an inverter that converts the DC voltage from the converter to AC voltage for supplying to a load; a DC power supply that is connected between the converter and the inverter so as to supply power to the load through the inverter when the AC power supply is determined to be abnormal and is deactivated; a current detector that detects current flowing between the AC power supply and the converter; and one or more processors that perform the following: extracting a DC component from the detected current flowing between the AC power supply and the converter; and when the extracted DC component is greater than a prescribed threshold current, causing the converter to stop operating and causing DC voltage from the DC power supply to be supplied to the inverter.

Here, if the current flowing between the AC power supply and the converter includes a DC component, magnetic bias (a phenomenon in which a DC component is introduced into the magnetic flux) can potentially occur in the input transformer. Therefore, as described above, in the uninterruptible power supply according to this aspect of the present invention, when the DC component is greater than the prescribed threshold current, operation of the converter is stopped. This prevents AC current including a DC component from being input to the input transformer via the converter, thereby making it possible to prevent magnetic bias from occurring in the input transformer. This, in turn, makes it possible to prevent operation of the uninterruptible power supply from becoming abnormal due to magnetic bias in the input transformer.

In the uninterruptible power supply according to the aspect described above, the one or more processors may further cause the converter to restart once a first prescribed period of time has elapsed from when the converter was stopped due to the DC component being greater than the prescribed threshold current. Here, during the period in which operation of the converter is stopped, the voltage of the DC power supply is supplied to the load. Therefore, restarting the converter once the first period of time has elapsed from when operation of the converter was stopped makes it possible to prevent an increase in consumption of power from the DC power supply in comparison to a case in which the converter is not restarted. Restarting the converter once the first period of time has elapsed from when operation of the converter was stopped is particularly effective when the DC power supply is a battery with limited power supply capacity.

Further, the one or more processors may generate a converter drive instruction signal that is forcedly changed to a low state whenever the DC component becomes greater than the prescribed threshold current, and returns to a high state after the first prescribed period of time has elapsed since changed to the low state, and the one or more processors may cause the converter to stop and restart according to the high and low states of the converter drive instruction signal. This configuration makes it possible to stop and restart the converter simply by changing the state of the converter drive instruction signal, thereby making it possible to simplify control of the converter.

In the above-described uninterruptible power supply, the one or more processors may cause operations of the converter, the inverter, and the DC power supply to stop, if the DC component becomes greater than the prescribed threshold current within a second prescribed period of time from when the converter is restarted. Here, when the DC component becomes greater than the prescribed threshold current again (within the second period of time) after the converter has been restarted, there is a high likelihood that this was caused by an abnormality in the main uninterruptible power supply unit rather than by some incidental factor such as disruption of the AC voltage from the AC power supply. Therefore, stopping the main uninterruptible power supply unit when the DC component becomes greater than the prescribed threshold current within the second period of time starting from when the converter is restarted makes it possible to prevent the main uninterruptible power supply unit from operating in a state in which such an abnormality remains present in the main uninterruptible power supply unit. This, in turn, makes it possible to more reliably prevent magnetic bias from occurring in the input transformer. On the other hand, if the DC component does not become greater than the prescribed threshold current again (within the second period of time) after the converter has been restarted, there is a high likelihood that any event previously observed was caused by some incidental factor such as disruption of the AC voltage from the AC power supply rather than by a true abnormality. Therefore, stopping the main uninterruptible power supply unit when the DC component becomes greater than the prescribed threshold current within the second period of time starting from when the converter is restarted makes it possible to prevent the main uninterruptible power supply unit from being stopped when no abnormality has actually occurred in the main uninterruptible power supply unit.

In this case, the one or more processors may cause the operations of the converter, the inverter, and the DC power supply to stop on the basis of a logical product of a DC component leading edge signal indicating a state of the DC component and a delayed converter drive signal obtained by delaying a converter drive signal indicating a state of the converter by the second prescribed period of time. Here, the logical value of the delayed converter drive signal changes once the second period of time has elapsed from when the logical value of the converter drive signal changed. Therefore, it makes it possible to make the delayed converter drive signal non-determinative (a state in which the logical product is determined by the logical value of the DC component detection signal) during the second period of time starting from when the logical value of the converter drive signal changed, and to make the delayed converter drive signal determinative (a state in which the logical product is determined by the logical value of the delayed converter drive signal) after the second period of time has elapsed from when the logical value of the converter drive signal changed. This makes it possible to stop operation of the main uninterruptible power supply unit on the basis of the state of the DC component detection signal only during the second period of time starting from when the logical value of the converter drive signal changed (that is, from when the delayed converter drive signal took the inactive state).

In the above-described uninterruptible power supply, the one or more processors may cause the operations of the converter, the inverter, and the DC power supply to stop if a number of times that the DC component becomes greater than the prescribed threshold current reaches a prescribed count that is at least two within a third prescribed period of time. Here, when the DC component becomes greater than the prescribed threshold current multiple times (within the third period of time), there is a high likelihood that this was caused by an abnormality in the main uninterruptible power supply unit rather than by some incidental factor such as disruption of the AC voltage from the AC power supply. Therefore, stopping the main uninterruptible power supply unit when the number of times that the DC component becomes greater than the prescribed threshold current reaches the prescribed count of at least two within the third period of time makes it possible to prevent the main uninterruptible power supply unit from operating in a state in which such an abnormality remains present in the main uninterruptible power supply unit. On the other hand, when the DC component does not become greater than the prescribed threshold current multiple times (within the third period of time), there is a high likelihood that any event previously observed was caused by a factor such as disruption of the AC voltage from the AC power supply. Therefore, stopping the main uninterruptible power supply unit when the number of times that the DC component becomes greater than the prescribed threshold current reaches the prescribed count of at least two within the third period of time makes it possible to prevent the main uninterruptible power supply unit from being stopped when no abnormality has actually occurred in the main uninterruptible power supply unit.

Moreover, this control can be implemented simply on the basis of the number of times that the DC component becomes greater than the prescribed threshold current, thereby making it possible to further simplify the control process for stopping the main uninterruptible power supply unit. Furthermore, setting the prescribed count to be relatively small makes it possible to stop the main uninterruptible power supply unit more quickly. In addition, setting the prescribed count to be relatively large makes it possible to more reliably detect that a given DC component is caused by an actual abnormality in the main uninterruptible power supply unit (rather than by factors such as disruption of the voltage from the AC power supply).

In this case, the one or more processors may increase a count each time that the DC component becomes greater than the prescribed threshold current and may reset the count each time the third prescribed period of time elapses. In this configuration, resetting the count makes it possible to ensure that the main uninterruptible power supply unit is stopped on the basis of only the most recent count. This, in turn, makes it possible to control the main uninterruptible power supply unit on the basis of the most recent state thereof, thereby making it possible to more appropriately implement the control process for stopping the main uninterruptible power supply unit.

In the uninterruptible power supply according to the aspect described above, the one or more processors may include a DC component extractor having a low-pass filter that extracts low-frequency components. This configuration makes it possible to use the low-pass filter to easily extract the low-frequency DC component (which has a frequency substantially equal to zero).

The present invention as described above makes it possible to prevent abnormal operation resulting from magnetic bias in an input transformer.

It is to be understood that both the foregoing general description and the following detailed description are exemplary and explanatory, and are intended to provide further explanation of the invention as claimed.

DETAILED DESCRIPTION OF EMBODIMENTS

Specific embodiments of the present invention will be described below with reference to figures.

Embodiment 1

Here, the configuration of an uninterruptible power supply 100 according to Embodiment 1 of the present invention will be described with reference to FIGS. 1 to 7.

(Configuration of Uninterruptible Power Supply)

First, the configuration of the uninterruptible power supply 100 will be described with reference to FIG. 1.

Figure 1:
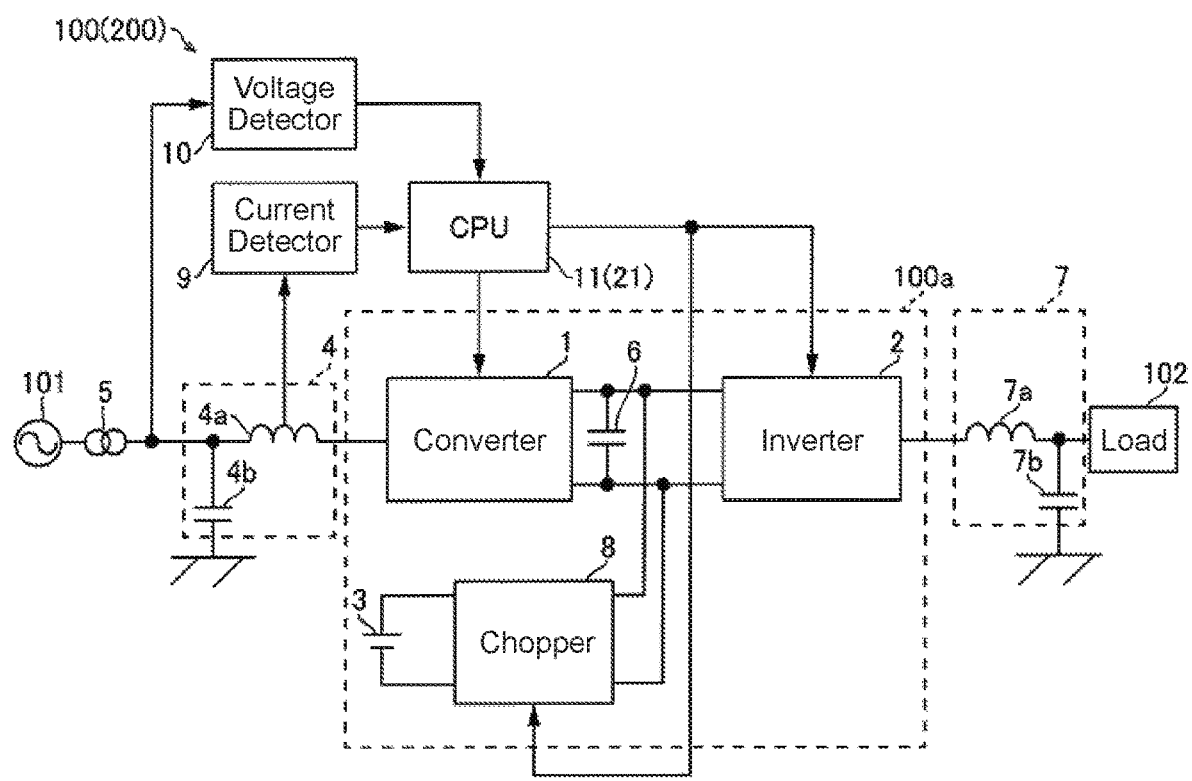
FIG. 1 illustrates the overall configuration of an uninterruptible power supply according to Embodiments 1 and 2 of the present invention.

As illustrated in FIG. 1, the uninterruptible power supply 100 includes a main uninterruptible power supply unit 100a including a converter 1, an inverter 2, and a battery 3. Here, the battery 3 is an example of a "DC power supply".

The converter 1 converts AC voltage from an AC power supply 101 to DC voltage. An AC filter 4 constituted by a reactor 4a and a capacitor 4b is arranged between the converter 1 and the AC power supply 101.

The uninterruptible power supply 100 further includes an input transformer 5 arranged between the AC power supply 101 and the converter 1 (AC filter 4). The input transformer 5 is provided to transform the AC voltage from the AC power supply 101.

The inverter 2 converts DC voltage from the converter 1 or from a chopper 8 (the battery 3) which will be described below to an AC voltage and supplies the converted AC voltage to a load 102. More specifically, during normal operation of the uninterruptible power supply 100, the inverter 2 converts the DC voltage supplied from the converter 1 to an AC voltage and outputs the resulting AC voltage. Moreover, when the AC power supply 101 is abnormal and the uninterruptible power supply 100 is operating under battery (backup) power, the inverter 2 converts DC voltage supplied from the chopper 8 (battery 3) to an AC voltage and outputs the resulting AC voltage.

Furthermore, a capacitor 6 for smoothing the DC voltage from the converter 1 is arranged between the converter 1 and the inverter 2. In addition, an AC filter 7 constituted by an reactor 7a and a capacitor 7b is arranged between the inverter 2 and the load 102.

The battery 3 is connected via the chopper 8 to between the converter 1 and the inverter 2. The chopper 8 is included within the main uninterruptible power supply unit 100a.

The chopper 8 is configured to step up or step down the DC voltage from the battery 3 to a voltage that can be used by the inverter 2 as well as to supply that stepped-up or stepped-down DC voltage to the inverter 2.

The uninterruptible power supply 100 includes a current detector 9 which detects current flowing between the AC power supply 101 and the converter 1 (that is, through the reactor 4a). The current detector 9 includes a current sensor such as a DC current transformer (DCCT), for example. The uninterruptible power supply 100 further includes a voltage detector 10 which detects the AC voltage from the AC power supply 101. The detection results from the current detector 9 and the voltage detector 10 are sent to a CPU 11, which will be described below.

Figure 2:
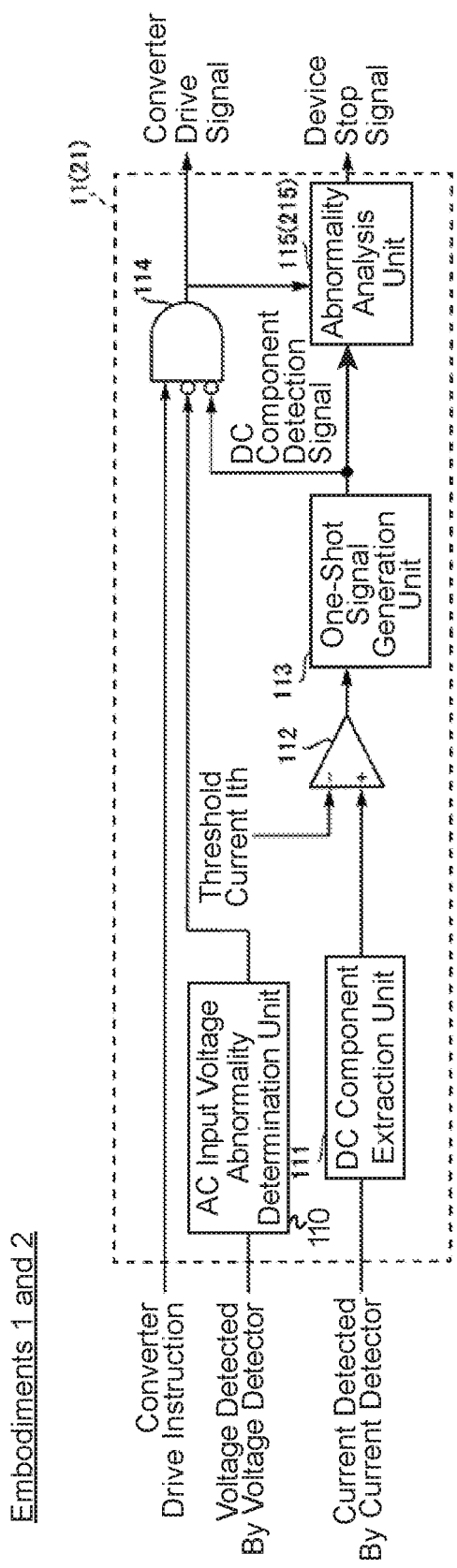
FIG. 2 illustrates the configuration of a controller of the uninterruptible power supply according to Embodiments 1 and 2.

The uninterruptible power supply 100 includes a CPU 11. As illustrated in FIG. 2, the CPU 11 is configured to function as an AC input voltage abnormality determination unit 110, a DC component extraction unit 111, a comparison unit 112, a one-shot signal generation unit 113, a logical product calculation unit 114, and an abnormality analysis unit 115. Note that in the CPU 11, the respective functions of the AC input voltage abnormality determination unit 110, the DC component extraction unit 111, the comparison unit 112, the one-shot signal generation unit 113, the logical product calculation unit 114, and the abnormality analysis unit 115 can be implemented in the form of software such as programs. Moreover, the CPU 11 and the DC component extraction unit 111 are respectively examples of a "processor" and a "DC component extractor".

The AC input voltage abnormality determination unit 110 (CPU 11) takes as input the AC voltage detected by the voltage detector 10 (see FIG. 1). More specifically, the voltage detected by the voltage detector 10 is converted to a digital value by an AD converter (not illustrated in the figure), and the converted digital voltage signal is input to the AC input voltage abnormality determination unit 110. Then, the AC input voltage abnormality determination unit 110 determines, on the basis of factors such as the frequency and amplitude of the digital voltage signal input thereto, whether the AC input voltage from the AC power supply 101 (see FIG. 1) is abnormal.

If the AC input voltage abnormality determination unit 110 determines that the AC input voltage from the AC power supply 101 is abnormal, the AC input voltage abnormality determination unit 110 outputs a High signal (with a logical value of 1) to the logical product calculation unit 114 (CPU 11). In this case, the High signal from the AC input voltage abnormality determination unit 110 gets inverted to a Low signal (with a logical value of 0) upon being input to the logical product calculation unit 114, and therefore a converter drive signal output from the logical product calculation unit 114 takes a Low state (a logical value of 0), and the converter 1 (see FIG. 1) is set to an inactive state. Meanwhile, if the AC input voltage abnormality determination unit 110 determines that the AC input voltage is not abnormal, the AC input voltage abnormality determination unit 110 outputs a Low signal (with a logical value of 0) to the logical product calculation unit 114.

The DC component extraction unit 111 (CPU 11) is configured to extract the DC component of the current flowing between the AC power supply 101 and the converter 1 (that is, through the reactor 4*a*; see FIG. 1). More specifically, the current detected by the current detector 9 (see FIG. 1) is converted to a digital value by an AD converter (not illustrated in the figure), and the DC component extraction unit 111 extracts the DC component from this converted digital current signal.

Figure 3:
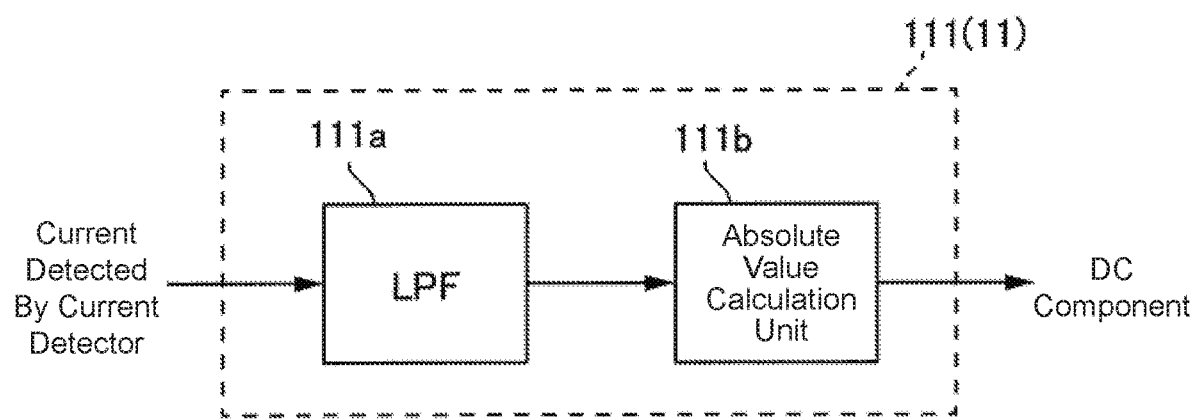
FIG. 3 illustrates the configuration of a DC component extractor according to Embodiments 1 and 2.

As illustrated in FIG. 3, in Embodiment 1 the DC component extraction unit 111 (CPU 11) includes a low-pass filter 111*a* that extracts low-frequency components. This low-pass filter 111*a* extracts (see FIG. 4) the DC component from the current detected by the current detector 9 (see FIG. 1). The DC component extraction unit 111 further includes an absolute value calculation unit 111*b*. The absolute value calculation unit 111*b* calculates the absolute value of the DC component extracted by the low-pass filter 111*a*. Note that the unit for extracting the DC component is not limited to this example.

Figure 4A:
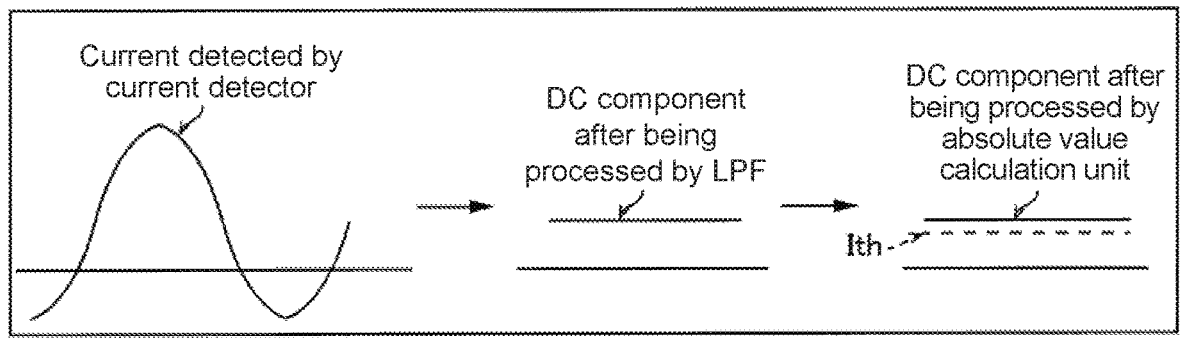
FIG. 4A is a drawing for explaining operation of the DC component extractor according to Embodiments 1 and 2 in a case in which the DC component is positive.
Figure 4B:
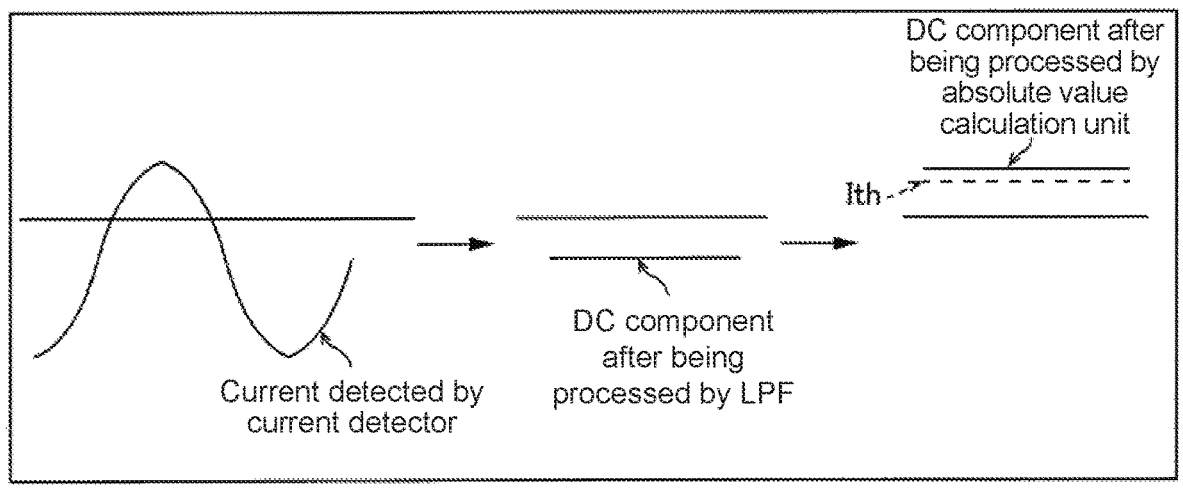
FIG. 4B is a drawing for explaining operation of the DC component extractor according to Embodiments 1 and 2 in a case in which the DC component is negative.

More specifically, as illustrated in FIG. 4A, when the current detected by the current detector 9 includes a positive DC component, the DC component calculated by the absolute value calculation unit 111*b* is a positive value. On the other hand, as illustrated in FIG. 4B, even when the current detected by the current detector 9 includes a negative DC component, the DC component calculated by the absolute value calculation unit 111*b* is still a positive value.

In Embodiment 1, the CPU 11 performs control such that operation of the converter 1 is stopped when the DC component extracted by the DC component extraction unit 111 is greater than a threshold current Ith. In this case, the CPU 11 performs a control process to supply the DC voltage from the battery 3 (see FIG. 1) to the inverter 2. The operation of the CPU 11 will be described in more detail later. Here, the threshold current Ith is an example of a "prescribed threshold current".

As illustrated in FIG. 2, the DC component extracted by the DC component extraction unit 111 (CPU 11) is input to the comparison unit 112 (CPU 11). The comparison unit 112 compares the DC component input thereto to the threshold current Ith, which is set in advance. If the input DC component is greater than the threshold current Ith, the comparison unit 112 outputs a High signal (with a logical value of 1). Alternatively, if the input DC component is less than the threshold current Ith, the comparison unit 112 outputs a Low signal (with a logical value of 0). The output signal from the comparison unit 112 is input to the one-shot signal generation unit 113.

The one-shot signal generation unit 113 (CPU 11), in accordance with the signal from the comparison unit 112, outputs a DC component detection signal representing the state of the DC component to the logical product calculation unit 114 and the abnormality analysis unit 115. More specifically, when a High signal is input from the comparison unit 112, the one-shot signal generation unit 113 outputs a DC component detection signal having a High state (a logical value of 1). In this case, regardless of the state of a converter drive instruction input to the logical product calculation unit 114 and the state of the signal from the AC input voltage abnormality determination unit 110, the output signal (converter drive signal) from the logical product calculation unit 114 takes the Low state (a logical value of 0). Moreover, this converter drive signal is also input to the abnormality analysis unit 115 (CPU 11). Meanwhile, when a Low signal is input from the comparison unit 112, the one-shot signal generation unit 113 outputs a DC component detection signal having a Low state (a logical value of 0). Furthermore, as will be described below, upon receiving a High signal as input, the one-shot signal generation unit 113 outputs a High signal for a prescribed period of time (a period of time t2; described later) starting from when the input High signal was input. In addition, after this prescribed period of time from when the input High signal was input has elapsed, the one-shot signal generation unit 113 forcedly changes the output signal to a Low signal.

Note that here, the converter drive instruction (signal) is a signal which takes a High state (a logical value of 1) when a user powers on the uninterruptible power supply 100 using a control panel or the like (not illustrated in the figures). The converter drive instruction signal is also forcedly changed to Low when the DC component detection signal becomes High. The converter drive instruction signal is automatically raised to High after a prescribed period of time t1 has elapsed since forcedly changed to Low. (See, FIGS. 6 and 7 and their explanations below.)

Figure 5A:
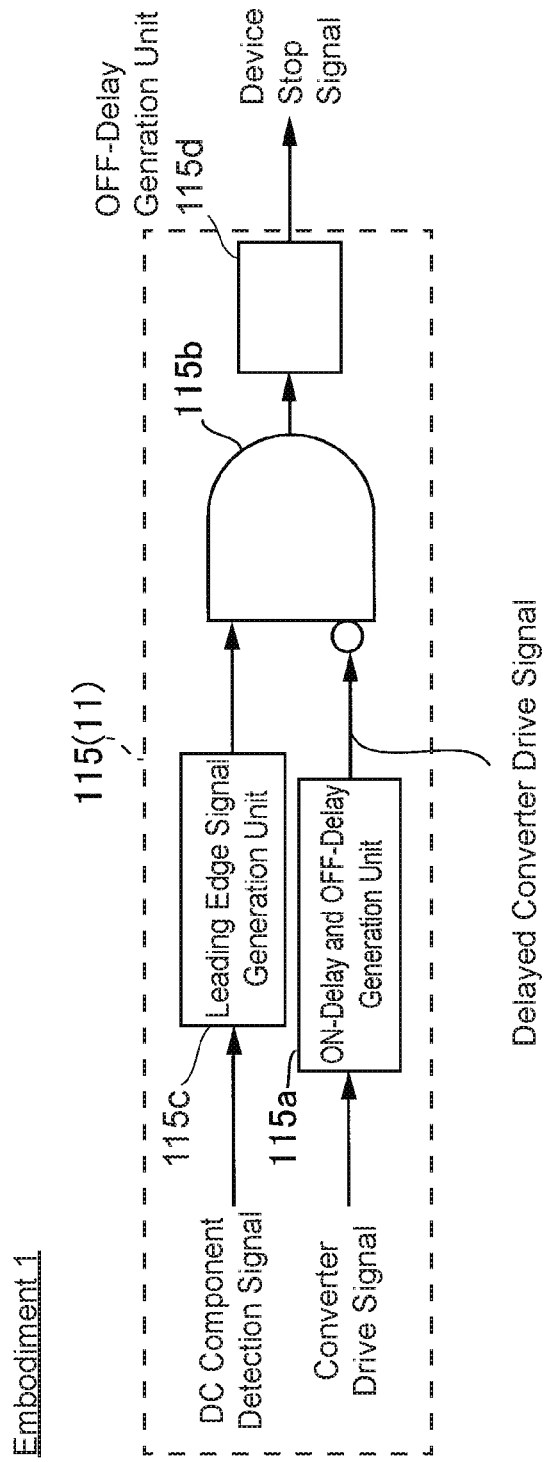
FIG. 5A illustrates a configuration of an abnormality analysis unit according to Embodiment 1.
Figure 5B:
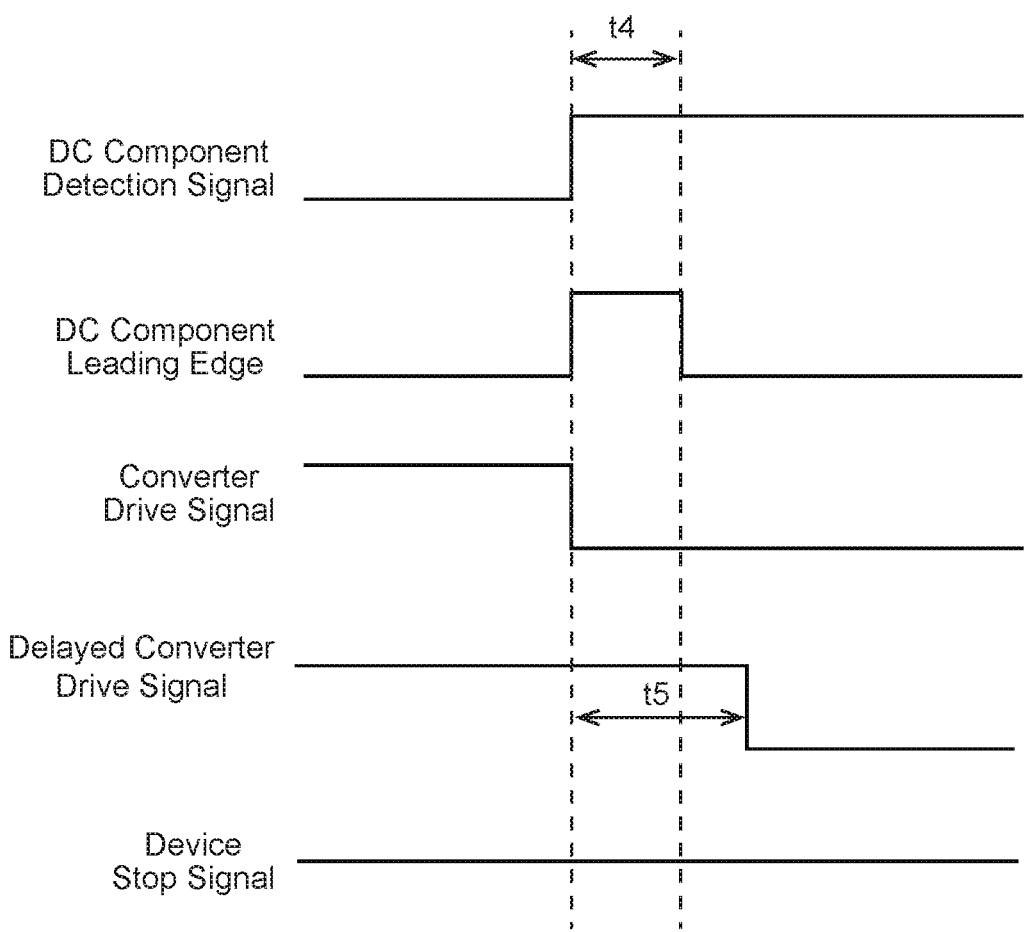
FIG. 5B is a timing chart for explaining the operation of the abnormality analysis unit of FIG. 5A.
Figure 6:
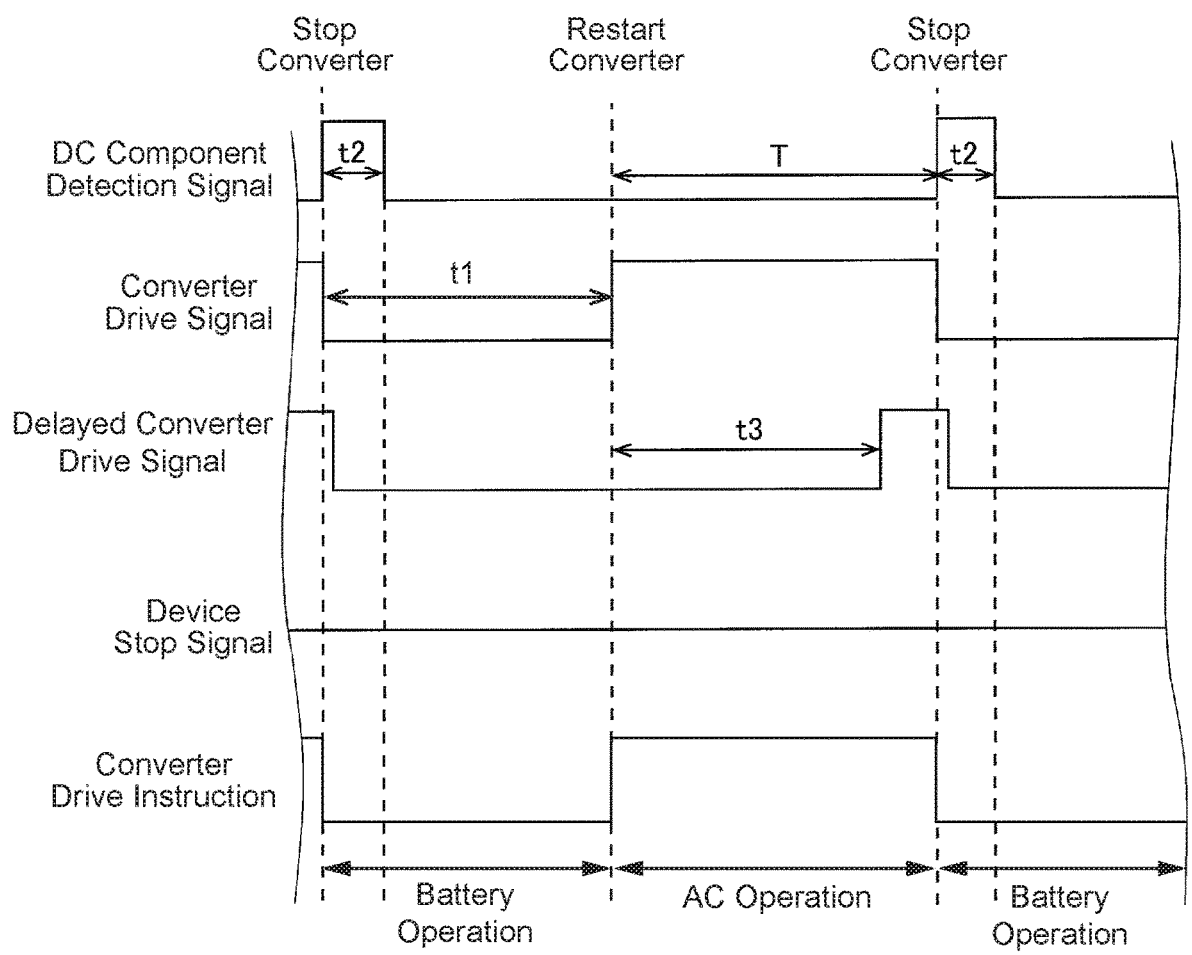
FIG. 6 is a timing chart for explaining control of the uninterruptible power supply according to Embodiment 1 in a case in which operation of a main uninterruptible power supply unit is not stopped.

As illustrated in FIG. 5A, the abnormality analysis unit 115 (CPU 11) includes an ON-delay and OFF-delay generation unit 115*a* which delays the leading edge and trailing edge of the converter drive signal (see FIG. 6). The ON-delay and OFF-delay generation unit 115*a* generates a delayed converter drive signal in accordance with the converter drive signal. The delayed converter drive signal will be described later. The abnormality analysis unit 115 also includes a leading edge signal generation unit 115*c* that generates a pulse with a duration t4 to indicate the leading edge of the DC component detection signal, as shown in FIG. 5B.

In Embodiment 1, the CPU 11 performs control such that operation of the main uninterruptible power supply unit 100*a* is stopped on the basis of the logical product of the DC component leading edge pulse and the delayed converter drive signal. More specifically, the abnormality analysis unit 115 (CPU 11) includes a logical product calculation unit 115b which outputs the logical product of the DC component leading edge pulse and the delayed converter drive signal as a device stop signal. Here, when the device stop signal is in a High state, operation of the main uninterruptible power supply unit 100a (the converter 1, the inverter 2, and the chopper 8) stops.

In more detail, when the DC component leading edge pulse is in the High state (with a logical value of 1) and the delayed converter drive signal is in the Low state (with a logical value of 0), the logical product calculation unit 115b (CPU 11) outputs a device stop signal having the High state (because the delayed converter drive signal is inverted to the High state upon being input to the logical product calculation unit 115b), which stops operation of the main uninterruptible power supply unit 100a (the converter 1, the inverter 2, and the chopper 8; see FIG. 1). FIG. 5B illustrates a case where the DC component detection signal becomes High while the converter is operating. As seen in FIG. 5B, because of the delay t5 of the trailing edge of the delayed converter drive signal due to the ON-delay and OFF-delay generation unit 115a, the device stop signal does not become High for this initial detection of the excessive DC component.

Figure 7:
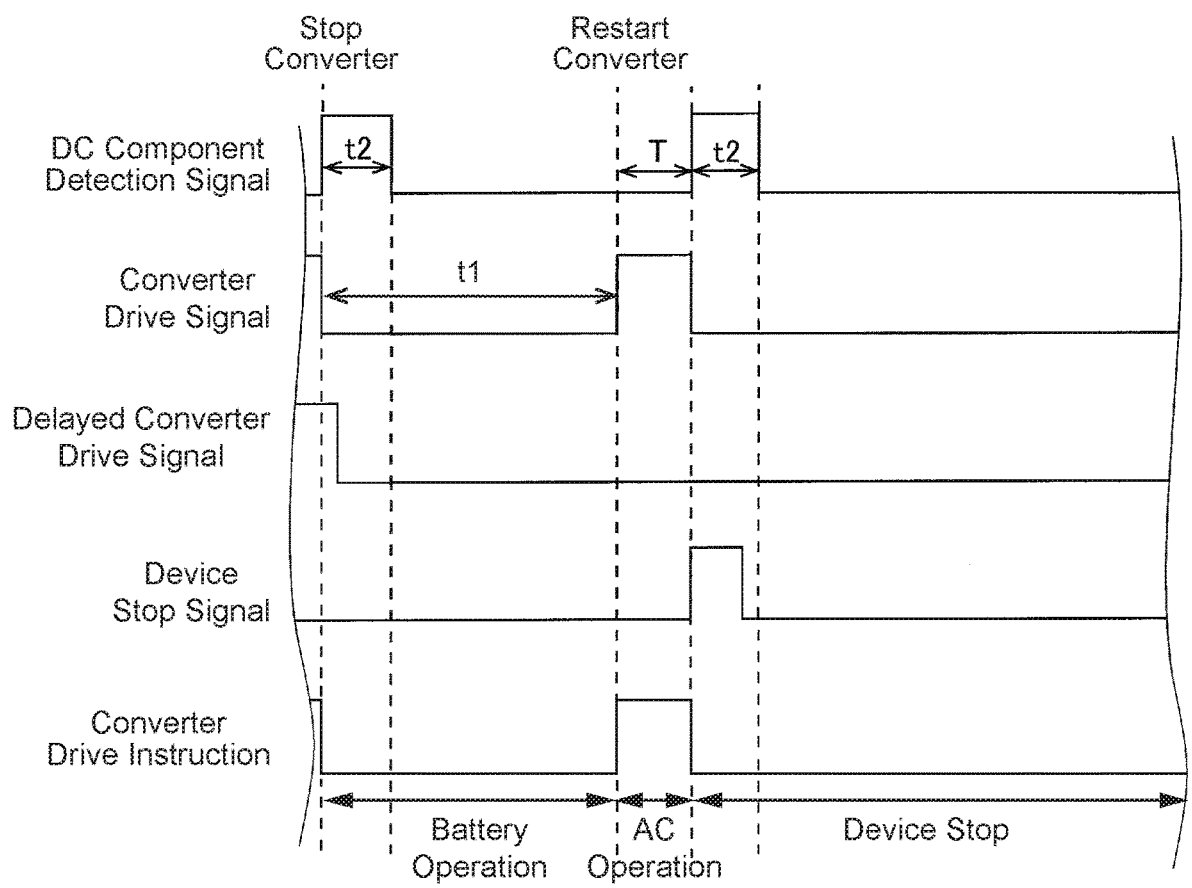
FIG. 7 is a timing chart for explaining control of the uninterruptible power supply according to Embodiment 1 in a case in which operation of the main uninterruptible power supply unit is stopped.

As illustrated in FIGS. 6 and 7, in Embodiment 1 the CPU 11 (see FIG. 2) performs control such that the converter 1 is restarted after a period of time t1 (10 seconds, for example) has elapsed from when the DC component became greater than the threshold current Ith and operation of the converter 1 (see FIG. 1) was stopped. More specifically, in response to the DC component detection signal taking the High state (with a logical value of 1), the converter drive signal output from the logical product calculation unit 114 (CPU 11; see FIG. 2) takes the Low state (with a logical value of 0). Then, in response to the DC component detection signal automatically returning to the Low state as will be described later, the converter drive signal automatically returns to the High state (that is, once the period of time t1 has elapsed from when the converter drive signal took the Low state) because the converter drive instruction becomes High after the time t1 (see, FIGS. 6 and 7). Moreover, during the period of time t1 from when the converter drive signal takes the Low state until the converter drive signal returns to the High state, the uninterruptible power supply 100 operates under battery (backup) power from the battery 3 (see FIG. 1). Here, the period of time t1 is an example of a "first prescribed period of time".

Furthermore, in Embodiment 1 the CPU 11 performs control such that the converter 1 is stopped by changing the DC component detection signal to the High state when the DC component becomes greater than the threshold current Ith, and the converter 1 is restarted by changing the DC component detection signal to the Low state once the period of time t2 (two seconds, for example) has elapsed from when the DC component detection signal changed to the High state. More specifically, the DC component detection signal that has changed to the High state is automatically returned to the Low state by the one-shot signal generation unit 113 (CPU 11; see FIG. 2) once the period of time t2 has elapsed from when the DC component detection signal took the High state. Note that although in FIGS. 6 and 7 the period of time t2 is depicted as being shorter than the period of time t1, the period of time t1 and the period of time t2 may be of the same length. Here, the High state and Low state of the DC component detection signal are respectively examples of a "first state" and a "second state".

Here, the ON time of the delayed converter drive signal is delayed by a period of time t3 (one minute, for example; see FIG. 6) relative to the ON time of the converter drive signal. Moreover, the OFF time of the delayed converter drive signal is also delayed relative to the OFF time of the converter drive signal by the On-delay and Off-delay generation unit 115a. Here, the period of time t3 is an example of a "second prescribed period of time".

As illustrated in FIG. 7, in Embodiment 1 the CPU 11 performs control such that operation of the main uninterruptible power supply unit 100a is stopped if the DC component becomes greater than the threshold current Ith within the period of time t3 (see FIG. 6) starting from when the converter 1 is restarted. More specifically, if a period of time T between when the converter 1 restarts (that is, when the converter drive signal takes the High state) and when the DC component becomes greater than the threshold current Ith (that is, when the DC component detection signal takes the High state) is shorter than the period of time t3, the device stop signal takes the High state. This happens because here, the DC component detection signal takes the High state before the delayed converter drive signal takes the High state due to the converter 1 having restarted (that is, the converter drive signal having taken the High state), which causes the device stop signal to take the High state. In this case, during the period in which the converter drive signal is in the High state, the uninterruptible power supply 100 operates using AC power from the AC power supply 101, and then after the DC component once again becomes greater than the threshold current Ith after the converter 1 has restarted, the main uninterruptible power supply unit 100a enters an inactive state.

On the other hand, when the period of time T is longer than the period of time t3 (see FIG. 6), the DC component detection signal takes the High state in a state in which the delayed converter drive signal has already taken the High state, and therefore the device stop signal remains in the Low state rather than taking the High state. In this case, during the period in which the converter drive signal is in the High state, the uninterruptible power supply 100 operates using AC power from the AC power supply 101, and then after the DC component once again becomes greater than the threshold current Ith after the converter 1 has restarted, the uninterruptible power supply 100 operates under battery (backup) power from the battery 3.

This is to say that during the period from when the converter 1 restarts (that is, when the converter drive signal takes the High state) until when the period of time t3 has elapsed (that is, when the delayed converter drive signal takes the High state), the device stop signal never takes the High state, regardless of the state of the DC component detection signal. In other words, the DC component detection signal is monitored and stop control of the main uninterruptible power supply unit 100a is performed based on the device stop signal only during the period of time t3 starting from when the converter 1 restarts (that is, when the converter drive signal takes the High state).

(Effects of Embodiment 1)

Embodiment 1 makes it possible to achieve the following effects.

As described above, in Embodiment 1 the uninterruptible power supply 100 includes the input transformer 5 which is arranged between the AC power supply 101 and the converter 1 and transforms the AC voltage from the AC power supply 101 as well as the DC component extraction unit 111 which extracts the DC component from the current flowing between the AC power supply 101 and the converter 1.

Moreover, the uninterruptible power supply 100 is configured to include the CPU 11 which, when the DC component extracted by the DC component extraction unit 111 is greater than the threshold current Ith, stops operation of the converter 1 and causes DC voltage from the battery 3 to be supplied to the inverter 2. Here, if the current flowing between the AC power supply 101 and the converter 1 includes a DC component, magnetic bias (a phenomenon in which a DC component is introduced into the magnetic flux) can potentially occur in the input transformer 5. Therefore, when the DC component is greater than the threshold current Ith, operation of the converter 1 is stopped. This prevents AC current including a DC component from being input to the input transformer 5 via the converter 1, thereby making it possible to prevent magnetic bias from occurring in the input transformer 5. This, in turn, makes it possible to prevent operation of the uninterruptible power supply 100 from becoming abnormal due to magnetic bias in the input transformer 5.

Furthermore, in an uninterruptible power supply the current between the converter and the AC power supply is typically detected using a sensor or the like. Thus, deactivation of the converter 1 can be controlled using detection results from a sensor that is already present, thereby making it possible to prevent an increase in the number of components or an increase in the number of types of components.

In addition, as described above, in Embodiment 1 the uninterruptible power supply 100 is configured such that the CPU 11 performs control such that the converter 1 is restarted after the period of time t1 has elapsed from when operation of the converter 1 was stopped due to the DC component being greater than the threshold current Ith. Here, during the period in which operation of the converter 1 is stopped, the voltage of the battery 3 is supplied to the load 102. Therefore, restarting the converter 1 after the period of time t1 has elapsed from when operation of the converter 1 was stopped makes it possible to prevent an increase in consumption of power from the battery 3 in comparison to a case in which the converter 1 is not restarted.

Moreover, as described above, in Embodiment 1 the CPU 11 stops the converter 1 by changing the DC component detection signal indicating the state of the DC component to the High state when the DC component becomes greater than the threshold current Ith. Furthermore, the uninterruptible power supply 100 is configured such that the CPU 11 performs control to restart the converter 1 by changing the converter drive instruction to High once the period of time t1 has elapsed from when the DC component detection signal changed to the High state.

In addition, as described above, in Embodiment 1 the uninterruptible power supply 100 is configured such that the CPU 11 performs control to stop the main uninterruptible power supply unit 100a if the DC component becomes greater than the threshold current Ith within the period of time t3 starting from when the converter 1 is restarted. Here, when the DC component becomes greater than the threshold current Ith again (that is, within the period of time t3) after the converter 1 has been restarted, there is a high likelihood that this was caused by an abnormality in the main uninterruptible power supply unit 100a rather than by an incidental factor such as disruption of the AC voltage from the AC power supply 101. Therefore, stopping the main uninterruptible power supply unit 100a when the DC component becomes greater than the threshold current Ith within the period of time t3 starting from when the converter 1 is restarted makes it possible to prevent the main uninterruptible power supply unit 100a from operating in a state in which such an abnormality remains present in the main uninterruptible power supply unit 100a. This, in turn, makes it possible to more reliably prevent magnetic bias from occurring in the input transformer 5. Meanwhile, if the DC component does not become greater than the threshold current Ith again (that is, within the period of time t3) after the converter 1 has been restarted, there is a high likelihood that any event previously observed was caused by some incidental factor such as disruption of the AC voltage from the AC power supply 101 rather than by a true abnormality. Therefore, stopping the main uninterruptible power supply unit 100a when the DC component becomes greater than the threshold current Ith within the period of time t3 starting from when the converter 1 is restarted makes it possible to prevent the main uninterruptible power supply unit 100a from being stopped when no abnormality has actually occurred in the main uninterruptible power supply unit 100a.

Moreover, as described above, in Embodiment 1 the uninterruptible power supply 100 is configured such that the CPU 11 performs control to stop the main uninterruptible power supply unit 100a on the basis of the logical product of the DC component leading edge pulse indicating the state of the DC component and the delayed converter drive signal obtained by delaying the converter drive signal indicating the state of the converter 1 by the period of time t3. Here, the logical value of the delayed converter drive signal changes after the period of time t3 has elapsed from when the logical value of the converter drive signal changed. Therefore, the delayed converter drive signal is non-determinative (a state in which the logical product is determined by the logical value of the DC component leading edge pulse) during the period of time t3 starting from when the logical value of the converter drive signal changed, and the delayed converter drive signal is determinative (a state in which the logical product is determined by the logical value of the delayed converter drive signal) after the period of time t3 has elapsed from when the logical value of the converter drive signal changed. This makes it possible to perform control so as to stop operation of the main uninterruptible power supply unit 100a on the basis of the state of the DC component detection signal only during the period of time t3 starting from when the logical value of the converter drive signal changed (that is, from when the delayed converter drive signal took the inactive state).

Furthermore, as described above, in Embodiment 1 the uninterruptible power supply 100 is configured such that the DC component extraction unit 111 includes the low-pass filter 111a that extracts low-frequency components. This makes it possible to use the low-pass filter 111a to easily extract the low-frequency DC component (which has a frequency substantially equal to zero).

Embodiment 2

Next, the configuration of an uninterruptible power supply 200 according to Embodiment 2 of the present invention will be described with reference to FIGS. 1, 2, 8, and 9. The uninterruptible power supply 200 according to Embodiment 2 is different from Embodiment 1 in that control for stopping the operation of the main uninterruptible power supply unit 100a is performed on the basis of a number of times that the DC component becomes greater than the threshold current Ith. Also, components that are the same as in Embodiment 1 above will be given the same reference characters as in Embodiment 1 and will not be described again here.

(Configuration of Uninterruptible Power Supply)

First, the configuration of the uninterruptible power supply 200 will be described with reference to FIGS. 1 and 2.

As illustrated in FIG. 1, the uninterruptible power supply 200 includes a CPU 21. As illustrated in FIG. 2, the CPU 21 is configured to function as an abnormality analysis unit 215. Note that in the CPU 21, the functionality of the abnormality analysis unit 215 can be implemented in the form of software such as a program. Moreover, the CPU 21 is an example of the "controller".

Figure 8:
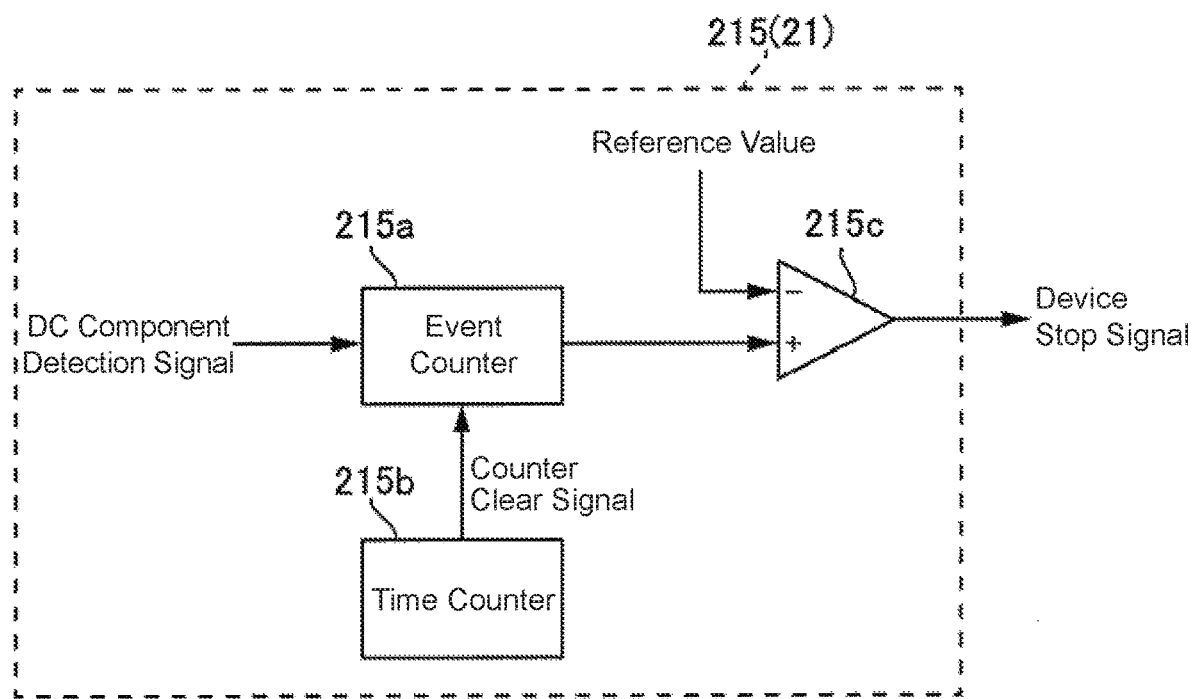
FIG. 8 illustrates the configuration of an abnormality analysis unit according to Embodiment 2.

As illustrated in FIG. 8, the abnormality analysis unit 215 includes an event counter 215a which counts the number of times that the DC component becomes greater than the threshold current Ith (see FIG. 2). The abnormality analysis unit 215 further includes a time counter 215b which resets the count of the event counter 215a. Furthermore, the abnormality analysis unit 215 includes a comparison unit 215c which compares the count of the event counter 215a to a reference value. In Embodiment 2, the reference value is set to 3.

Figure 9:
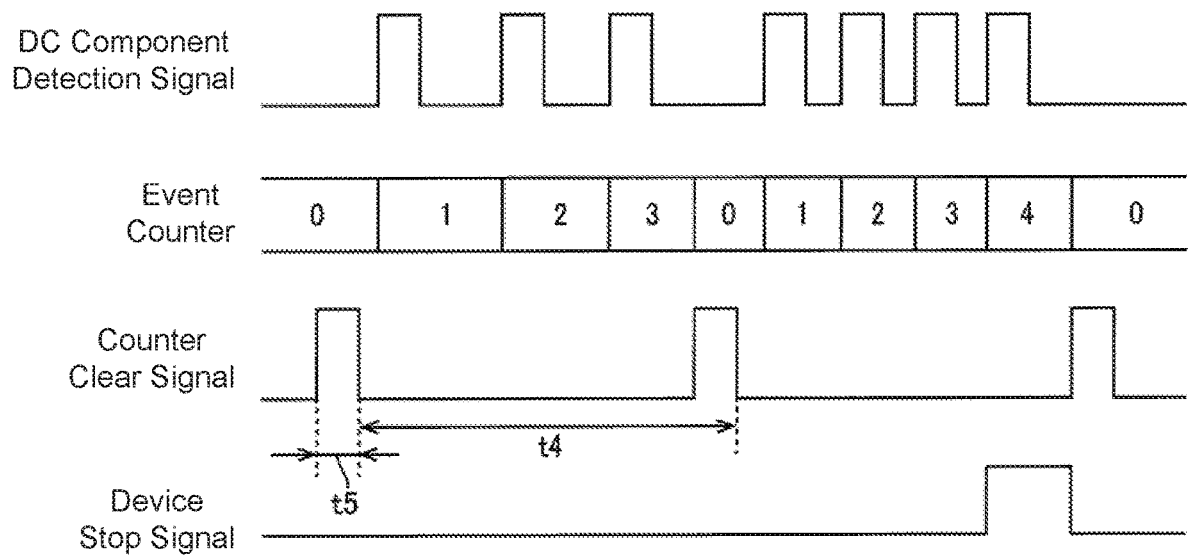
FIG. 9 is a timing chart for explaining control of the uninterruptible power supply according to Embodiment 2.

As illustrated in FIG. 9, in Embodiment 2 the CPU 21 (see FIG. 1) is configured to perform control such that operation of the main uninterruptible power supply unit 100a (see FIG. 1) is stopped if the number of times that the DC component becomes greater than the threshold current Ith (see FIG. 2) (that is, the number of times that the DC component detection signal takes the High state) reaches a value of four within a period of time t4 (10 minutes, for example). More specifically, when the count of the event counter 215a (see FIG. 8) reaches a value of four, the comparison unit 215c (see FIG. 8) outputs a device stop signal having the High state (a logical value of 1). Moreover, when the count of the event counter 215a is equal to one, two, or three, the converter drive signal (see FIG. 2) takes the Low state. Here, the period of time t4 is an example of a "third prescribed period of time". Moreover, the value of four is an example of a "prescribed count".

Furthermore, in Embodiment 2 the CPU 21 is configured to perform control such that the count is increased each time the DC component becomes greater than the threshold current Ith and the count is reset each time the period of time t4 elapses. In other words, each time the period of time t4 elapses, a counter clear signal which resets the count of the event counter 215a is output from the time counter 215b to the event counter 215a. When this counter clear signal is input to the event counter 215a, the count of the event counter 215a returns to zero. Moreover, the counter clear signal is a pulse signal (one-shot signal) which remains in a High state for a period of time t5.

The rest of the configuration of Embodiment 2 is the same as that of Embodiment 1 as described above.

(Effects of Embodiment 2)

Embodiment 2 makes it possible to achieve the following effects.

As described above, in Embodiment 2 the uninterruptible power supply 200 is configured such that the CPU 21 performs control such that the main uninterruptible power supply unit 100a is stopped if the number of times that the DC component becomes greater than the threshold current Ith reaches a value of four within the period of time t4. Here, when the DC component becomes greater than the threshold current Ith multiple times (four times) (within the period of time t4), there is a high likelihood that this was caused by an abnormality in the main uninterruptible power supply unit 100a rather than by some incidental factor such as disruption of the AC voltage from the AC power supply 101. Therefore, stopping the main uninterruptible power supply unit 100a when the number of times that the DC component becomes greater than the threshold current Ith reaches a value of four within the period of time t4 makes it possible to prevent the main uninterruptible power supply unit 100a from operating in a state in which such an abnormality remains present in the main uninterruptible power supply unit 100a. On the other hand, when the DC component does not become greater than the threshold current Ith multiple times (within the period of time t4), there is a high likelihood that any event previously observed was caused by a factor such as disruption of the AC voltage from the AC power supply 101. Therefore, stopping the main uninterruptible power supply unit 100a when the number of times that the DC component becomes greater than the threshold current Ith reaches a value of at least two (such as four) within the period of time t4 makes it possible to prevent the main uninterruptible power supply unit 100a from being stopped when no abnormality has actually occurred in the main uninterruptible power supply unit 100a.

Moreover, this control can be implemented simply on the basis of the number of times that the DC component becomes greater than the threshold current Ith, thereby making it possible to further simplify the control process for stopping the main uninterruptible power supply unit 100a.

Furthermore, as described above, in Embodiment 2 the uninterruptible power supply 200 is configured such that the CPU 21 performs control to increase a count each time the DC component becomes greater than the threshold current Ith and reset the count each time the period of time t4 elapses. Here, resetting the count makes it possible to ensure control for stopping the main uninterruptible power supply unit 100a on the basis of only the most recent count. This, in turn, makes it possible to control the main uninterruptible power supply unit 100a on the basis of the most recent state thereof, thereby making it possible to more appropriately implement the control process for stopping the main uninterruptible power supply unit 100a.

The rest of the effects of Embodiment 2 are the same as in Embodiment 1.

MODIFICATION EXAMPLES

It should be noted that in all respects, the embodiments described above are only examples and do not limit the present invention in any way. The scope of the present invention is defined by the claims, not by the descriptions of the embodiments above. Furthermore, the scope of the present invention also includes all changes (modification examples) made within the scope of the claims and their equivalents. In particular, it is explicitly contemplated that any part or whole of any two or more of the embodiments and their modifications described above can be combined and regarded within the scope of the present invention.

For example, although in Embodiments 1 and 2 above the DC component extractor (DC component extraction unit 111) was described as being one of the functions of the controller (CPU 11, 21), the present invention is not limited to this example. The DC component extractor may be provided separately from the controller, for example.

Moreover, although Embodiments 1 and 2 above were described as including the battery 3 as the DC power supply, the present invention is not limited to this example. A DC power supply other than a battery (storage-type) unit may be included, for example.

Furthermore, although in Embodiments 1 and 2 above the converter is stopped when the DC component detection signal takes the High state and the converter is restarted when the DC component detection signal takes the Low state, the present invention is not limited to this example. The converter may be stopped when the DC component detection signal takes the Low state, and the converter may be restarted when the DC component detection signal takes the High state, for example.

In addition, although in Embodiment 1 above the converter drive signal is delayed by the controller (CPU 11; ON-delay signal generation unit 115*a*), the present invention is not limited to this example. The overall converter drive signal may be delayed rather than delaying just the timing at which the converter drive signal rises, for example.

Moreover, although in Embodiment 2 above the operation of the main uninterruptible power supply unit is stopped when the number of times that the DC component becomes greater than the prescribed threshold current (threshold current Ith) reaches a value of four, the present invention is not limited to this example. Operation of the main uninterruptible power supply unit may be stopped when the number of times that the DC component becomes greater than the prescribed threshold current (threshold current Ith) reaches some value other than four but still greater than or equal to two, for example.

Furthermore, although in Embodiments 1 and 2 above the DC component is extracted using a low-pass filter, the present invention is not limited to this example. The DC component may be extracted using an approach other than using a low-pass filter, for example.

What is claimed is:

1. An uninterruptible power supply, comprising:
    an input transformer connected to an input node that is configured to be connected to an AC power supply so as to transform AC voltage from the AC power supply;
    a converter receiving the transformed AC voltage to convert the transformed AC voltage to DC voltage;
    an inverter that converts the DC voltage from the converter to AC voltage for supplying to a load;
    a DC power supply that is connected between the converter and the inverter so as to supply power to the load through the inverter when the AC power supply is determined to be abnormal and is deactivated;
    a current detector that detects current flowing between the AC power supply and the converter; and
    one or more processors that perform the following:
        extracting a DC component from the detected current flowing between the AC power supply and the converter; and
        when the extracted DC component is greater than a prescribed threshold current, causing the converter to stop operating and causing DC voltage from the DC power supply to be supplied to the inverter.

2. The uninterruptible power supply according to claim 1, wherein said one or more processors further cause the converter to restart once a first prescribed period of time has elapsed from when the converter was stopped due to the DC component being greater than the prescribed threshold current.

3. The uninterruptible power supply according to claim 2, wherein said one or more processors generate a converter drive instruction signal that is forcedly changed to a low state whenever the DC component becomes greater than the prescribed threshold current, and returns to a high state after the first prescribed period of time has elapsed since changed to the low state, and
    wherein said one or more processors cause the converter to stop and restart according to the high and low states of the converter drive instruction signal.

4. The uninterruptible power supply according to claim 3, wherein said one or more processors cause operations of the converter, the inverter, and the DC power supply to stop, if the DC component becomes greater than the prescribed threshold current within a second prescribed period of time from when the converter is restarted.

5. The uninterruptible power supply according to claim 4, wherein said one or more processors cause the operations of the converter, the inverter, and the DC power supply to stop on the basis of a logical product of a DC component leading edge signal indicating a state of the DC component and a delayed converter drive signal obtained by delaying a converter drive signal indicating a state of the converter by the second prescribed period of time.

6. The uninterruptible power supply according to claim 3, wherein said one or more processors cause the operations of the converter, the inverter, and the DC power supply to stop if a number of times that the DC component becomes greater than the prescribed threshold current reaches a prescribed count that is at least two within a third prescribed period of time.

7. The uninterruptible power supply according to claim 6, wherein said one or more processors increase a count each time that the DC component becomes greater than the prescribed threshold current and reset the count each time the third prescribed period of time elapses.

8. The uninterruptible power supply according to claim 2, wherein said one or more processors cause operations of the converter, the inverter, and the DC power supply to stop, if the DC component becomes greater than the prescribed threshold current within a second prescribed period of time from when the converter is restarted.

9. The uninterruptible power supply according to claim 8, wherein said one or more processors cause the operations of the converter, the inverter, and the DC power supply to stop on the basis of a logical product of a DC component leading edge signal indicating a state of the DC component and a delayed converter drive signal obtained by delaying a converter drive signal indicating a state of the converter by the second prescribed period of time.

10. The uninterruptible power supply according to claim 2, wherein said one or more processors cause the operations of the converter, the inverter, and the DC power supply to stop if a number of times that the DC component becomes greater than the prescribed threshold current reaches a prescribed count that is at least two within a third prescribed period of time.

11. The uninterruptible power supply according to claim 10, wherein said one or more processors increase a count each time that the DC component becomes greater than the prescribed threshold current and reset the count each time the third prescribed period of time elapses.

12. The uninterruptible power supply according to claim 1, wherein said one or more processors include a DC component extractor having a low-pass filter that extracts low-frequency components.

* * * * *